(12) United States Patent
Irizarry et al.

(10) Patent No.: US 10,773,917 B1
(45) Date of Patent: Sep. 15, 2020

(54) SHEET PROFILE INPUT FEATURE FOR DECURLER

(71) Applicant: Xerox Corporation, Norwalk, CT (US)

(72) Inventors: Roberto A. Irizarry, Rochester, NY (US); Erwin Ruiz, Rochester, NY (US); Rachel L. Tanchak, Rochester, NY (US); Carlos M. Terrero, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/442,979

(22) Filed: Jun. 17, 2019

(51) Int. Cl.
*H04N 1/00* (2006.01)
*B65H 29/70* (2006.01)
*G06K 15/00* (2006.01)

(52) U.S. Cl.
CPC ........... *B65H 29/70* (2013.01); *G06K 15/005* (2013.01); *G06K 15/4065* (2013.01); *B65H 2515/30* (2013.01)

(58) Field of Classification Search
CPC .. B65H 29/70; B65H 2515/30; G06K 15/005; G06K 15/4065

USPC .......................................................... 358/1.15
See application file for complete search history.

(56) References Cited

U.S. PATENT DOCUMENTS

| | | |
|---|---|---|
| 4,475,896 A | 10/1984 | Bains |
| 5,392,106 A | 2/1995 | Bigenwald et al. |
| 5,414,503 A | 5/1995 | Siegal et al. |
| 5,519,481 A | 5/1996 | Kuo et al. |
| 5,634,636 A | 6/1997 | Jackson et al. |
| 5,848,347 A | 12/1998 | Kuo et al. |
| 8,310,541 B2 | 11/2012 | Moore et al. |
| 2018/0164733 A1* | 6/2018 | Morita ................. B41J 29/38 |
| 2018/0203398 A1* | 7/2018 | Ishida ................. G03G 15/6582 |

* cited by examiner

*Primary Examiner* — Saeid Ebrahimi Dehkordy
(74) *Attorney, Agent, or Firm* — Gibb & Riley, LLC

(57) ABSTRACT

A sheet profile input area is displayed on a user interface. The user interface can be in communication with a processor and a decurler device. The decurler device receives sheets output by any form of sheet output device that may add curl to the sheets. User input that corresponds to the curl of the sheets is received into the sheet profile input area. The decurler device is controlled to remove the curl of the sheets based on the user input by causing the decurler device to contact the sheets after the sheets are output from the sheet output device.

20 Claims, 9 Drawing Sheets

SHEET PROFILE INPUT FEATURE FOR DECURLER

BACKGROUND

Systems and methods herein generally relate to decurler devices and systems and more particularly to inputs to, and controls of, devices that remove curl from sheets.

Devices that output sheets of media (e.g., paper, cardstock, transparencies, etc.) such as printers, sheet cutters, etc., must manage the curl of the sheets being output to prevent jams, avoid media damage (dog ears), and poor stack quality. For example, poor stack quality will limit post-process applications, such as an automatic folder for mailing inserts. For transactional applications, where the same type of image, with the same media, is printed over and over again, the output stacks often have a unique curl signature. This stack signature can have one or multiple modals curves. Stacks can also have a non-symmetrical curl. Many factors influence curl, but for applications such as pharmaceutical inserts, the curl signature is typically media dependent and is very consistent and repeatable, job after job.

Such curl in output stacks of sheets can be accommodated by limiting stack size because, due to the fact that the curl signature repeats sheets after sheet, the curl amplitude is defined by the total number of sheets. Therefore, one workaround to avoid jams or poor stack quality is to limit the stack height in order to reduce curl; however, this countermeasure affects productivity. Decurlers (devices that remove curl from sheets) can be used to address curl within stacks of sheets. Such decurlers apply a single decurler setting for the entire sheet, assuming a uniform shape of either downward or upward rise of the leading and trailing edges, limiting their effectiveness for combating multiple modes of curves in stacks.

SUMMARY

Various devices that address such issues herein can be, for example, sheet handling devices such as printing devices, finishing devices, stacking devices, etc., that are used in conjunction with decurler devices. Therefore, such devices can include (among other components) a sheet output device (e.g., printing engine, finishing device, etc.) that output sheets. In one example, the decurler device can be part of such a sheet output device and can be positioned to receive the sheets that are output, and a sheet stacker can be positioned to receive the sheets from the decurler device. With embodiments herein, a processor is operatively (meaning directly or indirectly) connected to the decurler device, and the processor is adapted to control the decurler device. Also, a user interface is operatively connected to the processor.

The processor is adapted to control the user interface to display a sheet profile input area. The sheet profile input area is adapted to receive user input that corresponds to the curl of the sheets output by the printing engine (e.g., the curl within a single sheet). For example, the user interface can include a pointer feature. The user input can be a line input through the pointer feature to the sheet profile input area, and the line can have at least one curved portion. Here, each curved portion of the line represents a magnitude of curl within the sheets.

In one example, the sheet profile input area can be a two-dimensional rectangular area adapted to receive curved line input as the user input. A length dimension of the two-dimensional rectangular area is adapted to receive the length of a sheet profile from the curved line input. A height dimension of the two-dimensional rectangular area is adapted to receive the curl height of the sheet profile from the curved line input. The height dimension of the two-dimensional rectangular area corresponds to the magnitude of different amounts of, and different directions (orientations) of, curl at different locations along the length of the sheet profile. The processor is adapted to control the decurler device to remove the curl of the sheets based on such user input. The decurler device is adapted to remove the curl of the sheets by contacting the sheets after the sheets are output from the printing engine.

In some examples herein, the processor is adapted to control the decurler device to apply different decurl forces in different directions to different areas of a sheet based on the curl magnitude and direction (orientation) of the user input. For example, the processor can be adapted to control the decurler device to vary the decurl forces applied to different length segments of each of the sheets based on the magnitude changes within the user input. Thus, the processor can be adapted to control the decurler device to apply a relatively higher amount of decurl force to locations along the length of the sheet profile that have a relatively higher magnitude of curl and to apply a relatively lower amount of decurl force to locations along the length of the sheet profile that have a relatively lower magnitude of curl.

Various methods use such systems/devices and display the sheet profile input area on the user interface. Again, the user interface is in communication with the processor and the decurler device, and the decurler device receives sheets output by any form of sheet output device.

With this, these methods can receive user input that corresponds to the curl of the sheets (e.g., into the sheet profile input area). The user input corresponds to curl within a single sheet. Again, the sheet profile input area can be a two-dimensional rectangular area, and the process of receiving the user input can receive curved line input from the user into the two-dimensional rectangular area as the user input. Thus, the process of receiving the user input can receive, into the length dimension of the two-dimensional rectangular area, the length of a sheet profile from the curved line input; and receive, into the height dimension of the two-dimensional rectangular area, the curl height of the sheet profile from the curved line input. Again, the height dimension of the two-dimensional rectangular area corresponds to the magnitude of different amounts of, and different directions (orientations) of, curl at different locations along the length of the sheet profile.

This allows these methods to control the decurler device to remove the curl of the sheets based on the user input (e.g., using the processor) by causing the decurler device to contact the sheets after the sheets are output from the sheet output device. Thus, the decurler device is controlled to cause the decurler device to apply different decurl forces in different directions to different areas of a sheet based on magnitude changes within the user input.

This process of controlling the decurler device can cause the decurler device to apply different decurl force to different areas of a sheet based on the magnitude and direction (orientation) changes within the user input. Thus, methods herein can cause the decurler device to apply a relatively higher amount of decurl force to locations along the length of the sheet profile that have a relatively higher magnitude of curl and to apply a relatively lower amount of decurl force to locations along the length of the sheet profile that have a relatively lower magnitude of curl.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
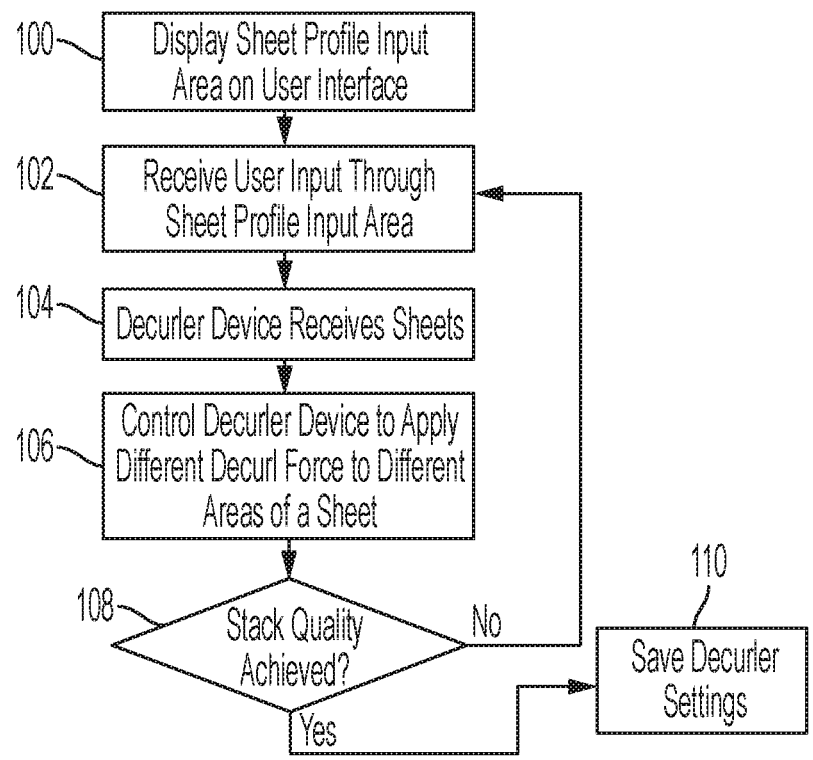
FIG. 1 is a flow diagram of various methods herein.

As mentioned above, decurlers are devices that remove curl from sheets and can be used to address undesirable curl accumulation within stacks of sheets. Conventional decurlers apply a single decurler setting (single magnitude and single direction) for the entire sheet (single mode), assuming a uniform curl of either downward or upward rise of the leading and trailing edges, but this limits the effectiveness of such single mode decurlers in combating multiple mode curves (curves of different magnitude and/or direction within a single sheet).

Changes in curl direction within a sheet (multimodal intra-sheet curl) are not addressed by decurlers having a single mode setting. For example, when using a decurler to remove curl from a stack of sheets, a job can be run to produce the stack of sheets and the completed stack can be observed, and then the decurler setting can be adjusted to a specific curl force and direction; however, this does not address changes of curl directions within a sheet and does not solve the issue of multi-directional (multimodal) curl within the stack of sheets.

More specifically, single mode decurler subsystems receive sheet property and image information to calculate a single direction and amount of indentation useful for decurling from a predetermined empirical model. Entrance and exit decurlers induce curl to counteract either downward curl or upward curl. Further, the decurler indentation is set before a sheet enters the decurler and is maintained unchanged for the entire sheet. Single mode decurlers do not change set-points within a sheet, but instead apply the same decurl force in the same direction to the entire sheet. Given that not all variables affecting the sheet shape can be accounted for, the predicted amount of indentation does not always yield flat sheets because of various noise factors including paper brand, component wear, high frequency service items (HFSI), contamination/life, environment, etc.

In other words, current user interfaces only allow for either: adding additional indentation to the existing predicted set-point (auto); or providing a single setting for the entire job (manual). This adjusts decurling on an entire sheet or entire job basis and does not provide different decurling set points within a single sheet.

Thus, users may adjust or fine tune the amount of single mode decurling that a single mode decurler provides through the user interface or non-volatile memory (NVM) settings; however, such controls are limited to either up or down curl, and do not account for multimodal intra-sheet curl. Sheet curl is often not uniform along the sheet, making a single decurler set point for a sheet ineffective. In addition, such decurling can create (add) curl to locations of the sheet not targeted for decurling. Such shortcomings of single mode decurlers often lead to undesirable stack quality as the residual sheet curl causes uneven stack growth.

In order to address such issues, the systems and methods herein provide a solution for multi-direction curl within a stack of sheets. With systems and methods herein, an inspection of the stack is used to make adjustment to the decurler set-points. A two-dimensional input area is provided to the user through the user interface to aid the user in translating the observed sheet shape (as seen at the top sheet of the stack) to decurler set-points. Thus, with systems and devices herein different set points can be set to different values and different orientations within a sheet to counteract multidirectional curl within the sheet. These set-points can be saved and used for recurrent jobs, which is particularly powerful in pharmaceutical, layer books applications, or other print shops where the same media type and size are run repeatedly.

This user input is used by systems and methods herein to automatically actuate the decurlers and counter the uneven stack buildup due to curl (or to prevent it all together) on subsequent runs. The user interface is therefore used by systems and methods herein to indicate to the decurler the location and direction of the different mode shapes (e.g., different magnitudes and directions of curl within a single sheet). This allows the decurler to provide opposing decurl actions within a single sheet to apply the opposite shapes to the sheet and thereby counteract and remove the curl.

The systems and methods herein thus provide an interactive interface for users to provide on the fly feedback of the stack quality, and this presents a way to address multimodal stack shape at low cost; and for repeated jobs, setting can be recalled, which saves set up time, improves productivity, and avoids trial runs.

FIG. 1 is a flowchart introducing exemplary embodiments herein. In item 100, these methods use the systems/devices described herein to display a sheet profile input area on a user interface. The user interface is in communication with a processor which can, for example, cause the user interface to display the sheet profile input area (100) in response to many occurrences including: a user previously selecting a menu option to adjust the decurler's settings; a decurler starting a new job or finishing a job; in response to paper jams or other failures; etc.

With this, in item 102, the methods herein can receive user input from the user in response to displaying the sheet profile input area (e.g., receive input into the sheet profile input area). This user input corresponds to the curl of sheets that may induce unwanted curl into the sheets (e.g., a printer, a finishing device, etc.). This sheet profile input area can be, in one example, a two-dimensional rectangular area on the user interface. The process of receiving the user input in item 102 can occur by receiving curved line input from the user into the two-dimensional rectangular area.

The user input received in item 102 corresponds to curl within a single sheet. Therefore, this process of receiving the user input in item 102 can receive, from the user into the length dimension of the two-dimensional rectangular area, the length of a sheet profile from the curved line input and, into the height dimension of the two-dimensional rectangular area, the curl height and direction (orientation) of the sheet profile from the curved line input. This height dimension of the two-dimensional rectangular area corresponds to the magnitude of different amounts, and different directions (orientations), of curl at different locations along the length of a single sheet's profile.

A decurler device, which is also in communication with the processor, receives sheets output by any form of curl inducing sheet output device in item 104. As shown in item 106, such methods control the decurler device to remove the curl of the sheets based on the user input (e.g., using the processor). More specifically, in item 106, these methods cause a contact element, such as the decurler device, to contact the sheets after the sheets are output from the sheet output device.

Specifically, in item 106 the decurler device is controlled to cause the decurler device to apply different decurl forces and orientations to different areas of a single sheet (e.g., vary the decurl force and decurl direction applied while decurling a single sheet) based on magnitude changes within the user input. Therefore, with methods herein the process of controlling the decurler device (106) can cause the decurler device to vary the decurl force applied to different length segments of each of the sheets (e.g., different decurl forces are applied to different areas (lengths) of a single sheet) where the different decurl forces that are applied within a single sheet are based on the magnitude/direction changes within the user input provided by the user in item 102.

In greater detail, in item 106, these methods can cause the decurler device to apply a relatively higher amount of decurl force to locations along the length of a single sheet that have a relatively higher magnitude of curl and to apply a relatively lower amount of decurl force to locations along the length of the sheet that have a relatively lower magnitude of curl.

In some embodiments, to prevent overshoot that would cause excessive curl, due to excessive indentation, a maximum amount of indentation (either in amount of force or slope of curvature) may be applied by the processor in item 106, regardless of what the user has drawn on the two-dimensional input area in the user interface.

Thus, once the shape of the top sheet in the stack is automatically interpreted by the processor from the user input, the processor controls the decurler in item 106 to indent the sheet in directions opposite to the curl represented by the user input to remove the existing curl and flatten the sheets, thereby creating flat stacks. This procedure can be iterative until the desired stack quality is achieved, as shown by item 108 that returns processing back to item 102 to receive refinements to the user input if the desired stack quality was not achieved by the previous settings. For example, in item 108, the user can be asked to select from menu choices on the user interface as to whether the desired stack quality was achieved or not. When the desired stack quality is achieved, the final settings (along with the current job parameters) can be saved in item 110 for use on the same or similar future jobs.

Figure 2:
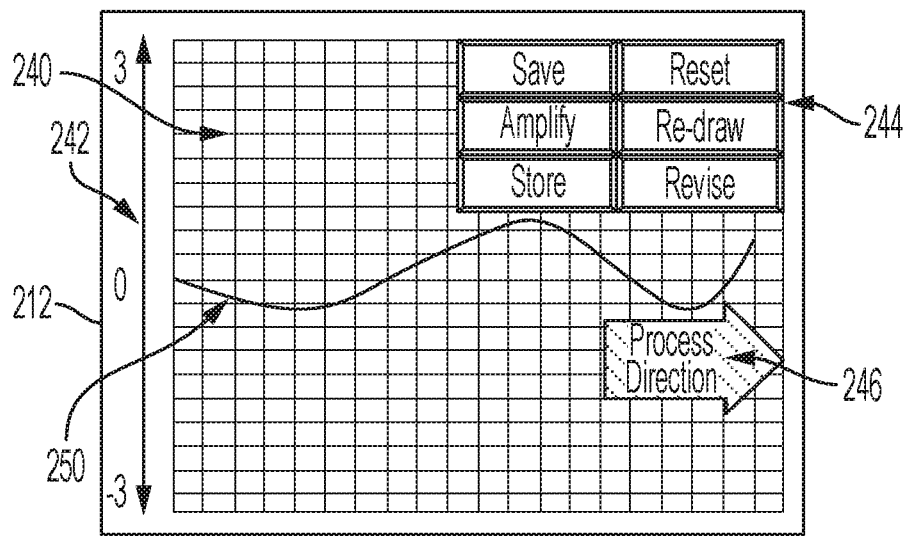
FIGS. 2-4 are schematic diagrams illustrating two-dimensional rectangular areas provided by methods and systems herein.

FIG. 2 illustrates an exemplary user interface that is adapted to display an exemplary two-dimensional rectangular area 240. Those ordinarily skilled in the art would understand that differently shaped areas could be displayed and item 240 is intended to represent all such areas that can receive a line from a user. The two-dimensional rectangular area 240 includes an arbitrary reference scale 242 between 3 and −3, with the midpoint (0) representing a flat sheet. Positive magnitude indicates curl (and the need for decurl force) in a first amount and in a first direction, while negative magnitude indicates curl (and the need for decurl force) possibly in a second amount and in a second direction that is opposite the first direction. Thus, this arbitrary number scale 242 (which can have different numerical ranges than that presented in this example) may be provided to represent relative curl to the user to help the user be consistent and reasonable with their inputs. Also note that the two-dimensional rectangular area 240 can include various graphic instructions or helpful graphic aids 246, such as an indication of the process direction the sheet will pass through the decurler to help the user understand the relationship between the two-dimensional rectangular area 240 and the sheet.

In addition, various option buttons 244 can be included within the two-dimensional rectangular area 240 to provide the user different options. In some examples, these button 244 can be used to execute functions including, but not limited to, save (save shape for use until another is selected); amplify (increase indentation (amplitude) level but maintain shape, which is useful when the initial shape was correct but indentation was not sufficient to fully remove all curl); store (store for use in future stacks/jobs (also saves media and job information)); reset (go back initial GUI state); re-draw (clear the existing line (leaving no line or a straight line) to allow a new line to be drawn); revise (leave the existing line and move the portions of existing line based on additional user input); and many other functions, etc.

As noted above, the user interface 212 can include different devices for receiving user input including touchscreen, mouse, arrow keys, voice recognition, etc. For convenience of illustration, a touchscreen is used in the examples herein; however, those ordinarily skilled in the art would understand that any form of input device could be utilized in place of the touchscreen, and all embodiments herein are intended to include such alternative user inputs and devices.

As used herein the "edge" of the sheet is that relatively narrow part of the sheet that is between the front and back sides of the sheet (printing is performed on the front and/or back sides of the sheet and not on the edges) and that is parallel to the processing direction (where the processing direction is the direction that the sheet moves through the decurler device).

With the methods and systems herein, the user provides user input to the user interface 212 (again, touchscreen input in this example) to manually draw a line 250 within the two-dimensional rectangular area 240. The line 250 represents the way the curl within the profile (e.g., side or edge) of a sheet that is being provided to the decurler device appears to the user.

In other words, the line 250 that is input by the user into the user interface 212 demonstrates what the user interprets as positive and negative magnitude measurements of curl within one of the sheets (e.g., the top sheet on a stack of sheets) that is being provided to the decurl device. For convenience of discussion, this line 250 is sometimes referred to as the user input 250, as the two represent the same concept. As noted above, the methods and systems herein cause the decurler device to apply different decurl forces in different directions to different areas of a single sheet (e.g., vary the force applied while decurling a single sheet) based on magnitude and direction changes within the user input 250.

Figure 3A:
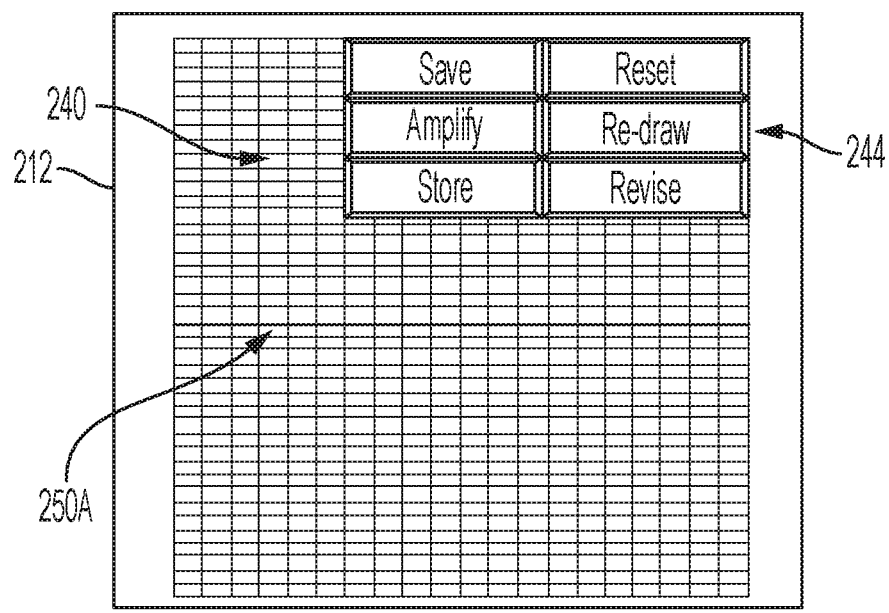

FIGS. 3A-3D and 4 provide illustrative examples of how a user can provide the profile input 250. Note that some of the features shown in FIG. 2 are omitted from FIGS. 3A-3D and 4 in order to reduce clutter in FIGS. 3A-3D and 4. More specifically, FIG. 3A illustrates one example of how the user input 250A can appear (e.g., as a flatline) when the user is initially provided with the two-dimensional rectangular area 240 on the user interface 212. In other alternatives, no line may appear allowing the user to draw a freeform line within an otherwise blank two-dimensional rectangular area 240.

Alternatively, the expected shape can be automatically generated by the processor using a previously generated transfer function (which may have been previously saved in item 110 discussed above). Such a transfer function can be developed by experimentation with job parameters as inputs (e.g., items within the print job: image details, image placement, paper weight, etc.). Therefore, given certain inputs (e.g., image, image placement, paper weight, etc.) the amount or curve that will be induced by the printer when printing the print job can be automatically predicted by the processor, and an initially curved line showing such predicted curve of the printed output may be provided in place of the straight line 250A. In such a situation, the user interface with the two-dimensional input area provided herein can be used only for minor adjustments to the automatically generated predicted curved line, limiting the amount of interaction needed from the user and thereby increasing ease of use.

Figure 3B:
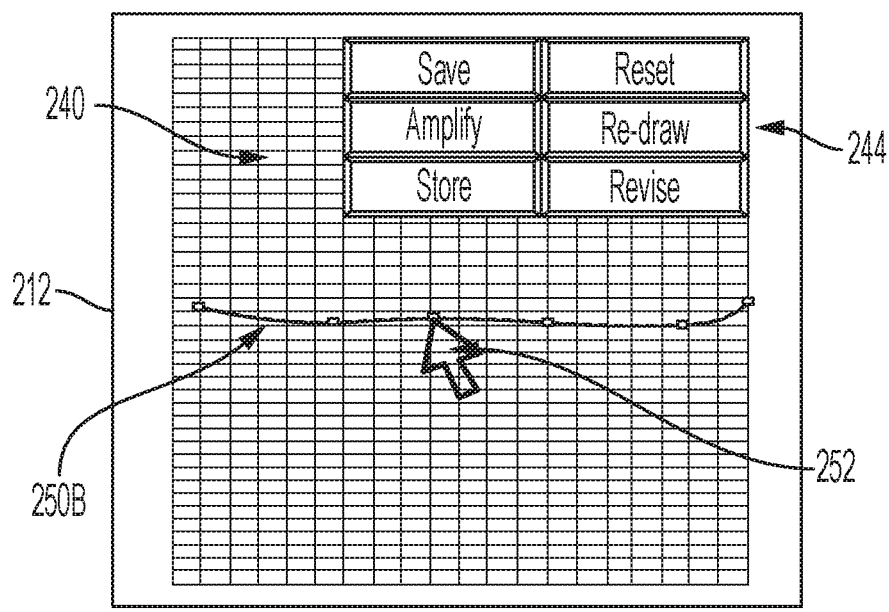
Figure 3C:
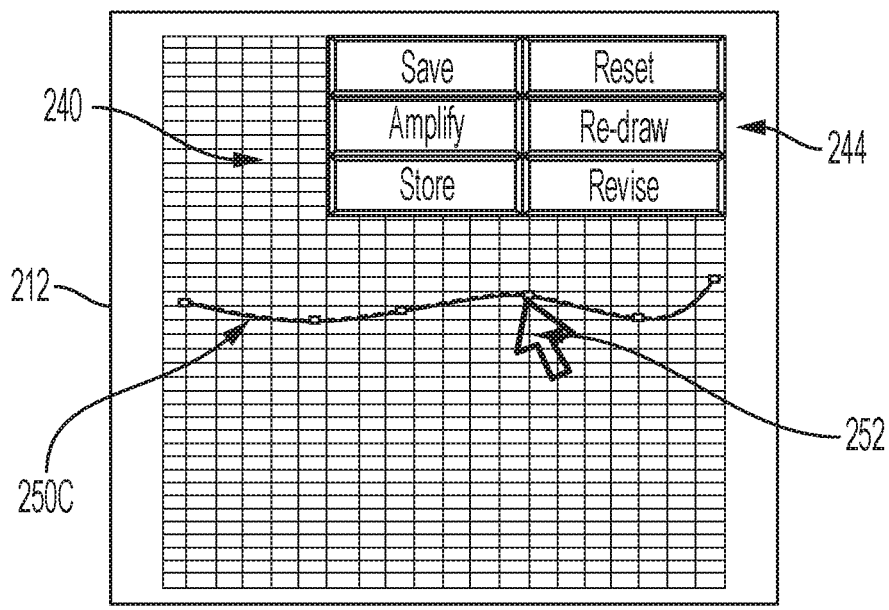
Figure 3D:
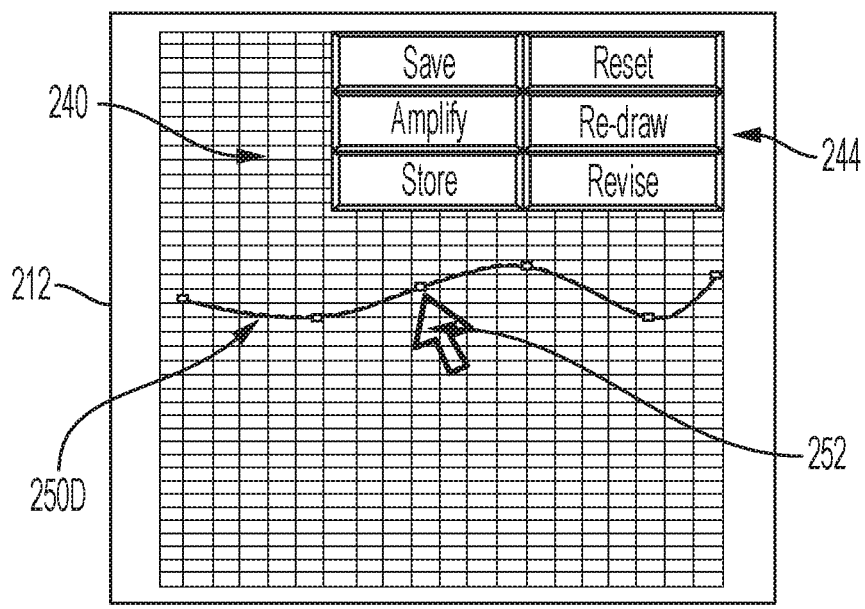

FIG. 3B illustrates the results of some user manipulation of the user interface 212 where user input is made to the touchscreen, mouse, arrow keys, voice recognition, etc.; and such manual user manipulation of the user interface 212 is represented in FIGS. 3B-3D by arrow 252. As can be seen in FIG. 3B, the user input 252 changes the initial flat line user input 250A to have some initial curvature, which is represented in FIG. 3B as modified user input line 250B. Similarly, FIGS. 3C-3D show the result of additional user input 252, resulting in further adjusted user input lines 250C-250D.

Therefore, as shown, the two-dimensional input area 240 in the user interface 212 can be presented as a dimensioned grid with an overlaid line 250 representing the profile or contour of the top sheet in the stack of sheets. Again, the user is permitted to manipulate the line 250 via mouse pointer, touch interface, etc. 212. The line 250 may be manipulated by selecting and dragging nodes on the line 250 to mimic the multi modal curved nature of the stack. For example, FIGS. 3B-3D show dots along the modified user inputs 250B-250C that represent setpoints; and, therefore, in some embodiments herein, the user may be provided the capability to adjust such setpoints to alter the shape of the line 250. While FIGS. 3A-3D illustrate one example how the user can provide the user input 250; many other processes are provided by embodiments herein. Thus, in other examples, the user may be provided the capability to manipulate all portions of the initial linear user input 250 and not just the setpoints.

In other alternatives herein, the user may be provided the capability to draw a freeform line within a blank (line-less) two-dimensional rectangular area 240 (e.g., from left to right or right to left) in order to manually continuously trace out (add) the user input line 250 to the two-dimensional rectangular area 240. In such embodiments the initial straight line 250A may not be provided, but a grid without a line can be initially provided. For example, when providing such continuous free form line input, the user can hold down an input button on a movable device (e.g., mouse, trackpad, etc.) or hold down their finger (or a stylus) on a touch screen and move the input device from one side of the two-dimensional rectangular area 240 to the other without releasing the button/finger, while moving up and down relative to the center line (0), in a manner to recreate (in the two-dimensional rectangular area 240) the curls, curves, profile, or contour that the user observes in the edge of the sheet (after the sheet is output by the sheet output device, but before the sheet is fed into the decurler device).

Figure 4:
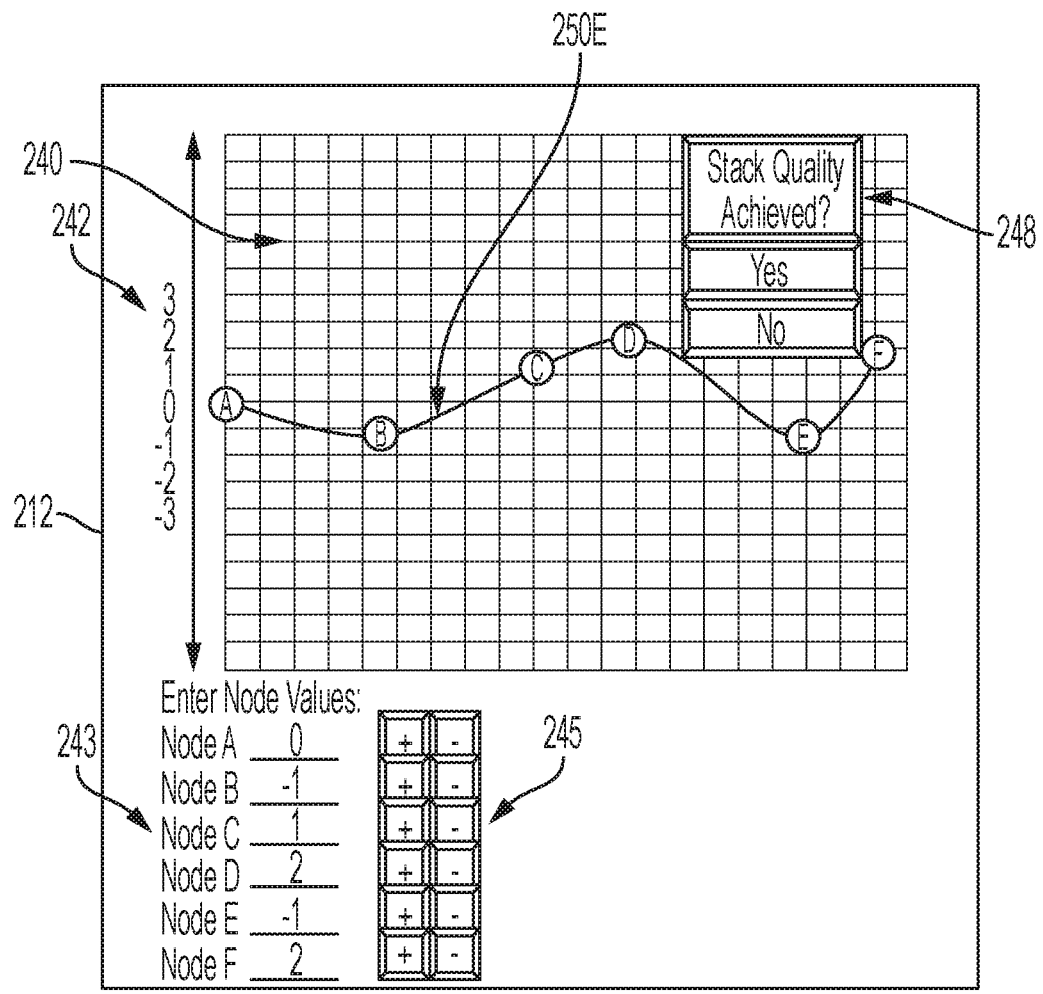

Alternatively, as shown in FIG. 4, blank input fields 243 or up/down (+/−) adjustment buttons 245 may be provided for the user to key in stack measurement values at different sheet lengths (e.g., node A-F of user input line 250E) instead of drawing the user input line. As shown in FIG. 4, such measurement values (e.g., again in this non-limiting example are arbitrarily between +3 and −3) can graphically be represented by changes in the line 250E on the user interface 212 as they are input into the input fields 243. As can be seen in FIG. 4, a positive value input into the input fields 243 forms a curve in a first direction and a negative value forms a curve in the opposite direction; and larger magnitudes of such values form larger curves.

Therefore, either no line or a straight line can be initially provided in the two-dimensional rectangular area 240 in FIG. 4. When a number (e.g., between +3 and −3) is entered (or toggled 245) in one of the input fields 243, one of the nodes A-F appears or moves and the line 250E bends in coordination (and potentially immediately after such an input) on the user interface. This helps the user visualize in real time how their numeric inputs to the input fields 243 create and represent the profile of the sheet through the changing shape of the user input line 250E.

As noted above in the discussion of item 108 in FIG. 1, the user can be asked to select from menu choices on the user interface 212 as to whether the desired stack quality was achieved or not. Exemplary menus 248 are shown in FIG. 4 which allow the user to indicate whether the desired stack quality was achieved through "yes" and "no" buttons.

Figure 5A:
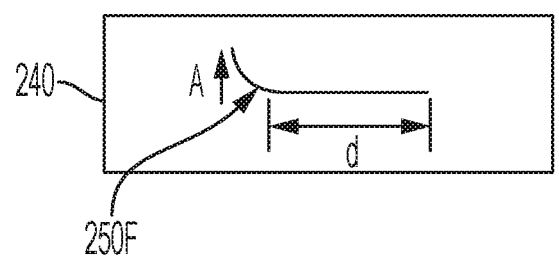
FIGS. 5A-5C are schematic diagrams illustrating processing performed by methods and systems herein.
Figure 5B:
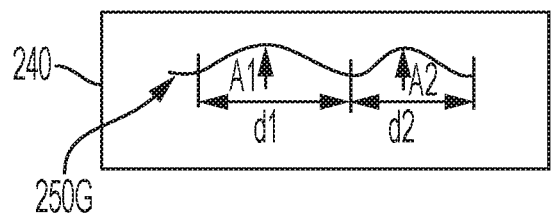
Figure 5C:
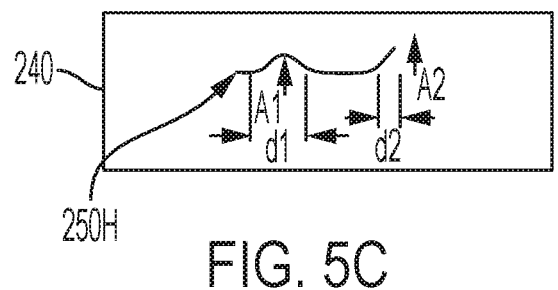

FIGS. 5A-5C are schematic diagrams illustrating processing performed by methods and systems herein. More specifically, FIG. 5A conceptually illustrates an exemplary user input 250F that could be provided by a user through the two-dimensional rectangular area 240 on the user interface 212. The systems herein (e.g., the processor) automatically determine the amplitude (A) of the user input 250F as the magnitude of the curl within a sheet and automatically determine a distance (d) of the sheet that does not experience the curl from the user input 250F. Again, the sign (positive or negative) of the magnitude indicates direction of the curl. Here also the processor can calculate the slope (e.g., f(x,y), curve function, plot, etc.) between the beginning of the curl and the beginning of the flat section of the sheet based upon the slope of the user input 250F. This allows a processor to control the decurl device to apply a decurl force to the sheet that is opposite the slope and magnitude of the curl, yet to not apply any decurl force to the portion of the sheet that is flat (distance d). This allows the decurler to remove the existing curl, without adding curl to flat portions of the sheet.

FIG. 5B shows another exemplary user input 250G that includes multiple curls that the processor automatically recognizes as having potentially different curl magnitudes equal to amplitudes A1 and A2. Further, from the user input 250G, the processor determines the slope of each curl and the length distance of each curl (d1, d2) within the sheet. This again allows the processor to control the decurl device to apply potentially different decurl forces (in potentially different directions) to the sheet that are opposite the slopes and magnitudes of the curls within the user input 250G to remove the existing curl, without adding curl to flat portions of the sheet.

FIG. 5C shows another exemplary user input 250H that includes multiple curls between flat sections of a sheet that the processor automatically recognizes as having potentially different curl magnitudes equal to amplitudes A1 and A2.

Further, the processor determines the slope of each curl and the distance of each curl (d1, d2) within the sheet based upon the user input 250H. This again allows the processor to control the decurl device to apply potentially different decurl forces to the sheet that are opposite the slopes and magnitudes of the curls within the user input 250H, yet to not apply any decurl force to the portion of the sheet before, after, and between the curls that is flat (outside distances d1 and d2). Again, this removes the existing curl, without adding curl to flat portions of the sheet.

Figure 6:
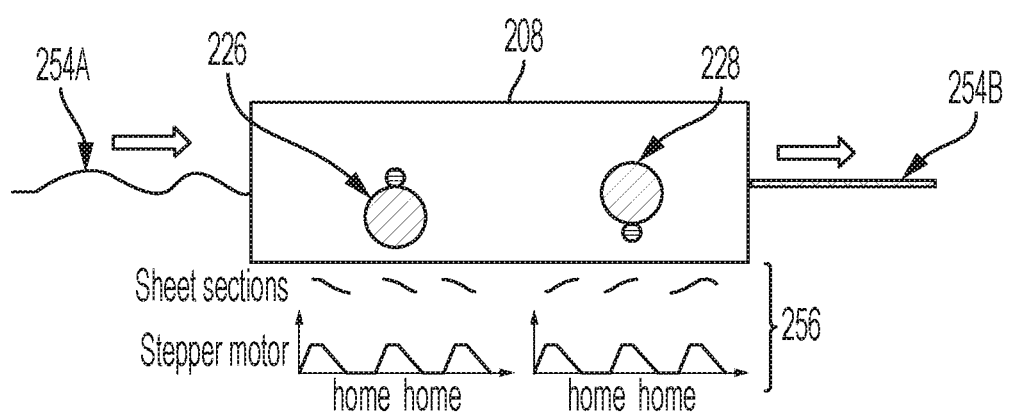
FIG. 6 is a schematic diagram illustrating a decurler device herein.

FIG. 6 illustrates an exemplary decurl device 208 that includes various contact elements, such as an entrance decurler mechanism 226 and an exit decurler mechanism 228. Each of the decurler mechanisms 226, 228 includes potentially different sized rollers that have different elasticities. For example, each decurler mechanism 226, 228 could include a relatively larger, softer roller that contacts a relatively smaller, harder roller, where the two rollers form a decurl nip. When the sheet of paper passes through such a decurl nip, the harder roller extends the sheet into the softer roller causing the sheet to be bent toward the relatively smaller harder roller, and the amount of bend or curl imparted into the sheet is dependent upon the force exerted between the opposing rollers within the decurl nip, the weight of the paper, etc.

Further, the different decurler mechanisms 226, 228 are inverted in orientation relative to one another within the decurl device 208, in order to impart opposite directional decurl forces to the sheets. In other words, decurler mechanism 226 produces an opposite curl in the sheet relative to the curl decurler mechanism 228 produces. The decurl device 208 applies a decurl force that is opposite the existing curl within a sheet to remove the curl from the sheet, and so that the sheet is output from the decurl device 208 in a flat state without any curl.

Herein, the decurl pressure within each different nip of the different decurler mechanisms 226, 228 is constantly adjusted as a single sheet passes through the decurl device 208 to apply different magnitudes and potentially different directions (orientations) of the decurl force to each sheet to thereby remove potentially multiple different curls from each sheet and make each sheet flat. Again, the processor controls the decurl device 208 to apply potentially different decurl forces to the sheet that are opposite the slopes and magnitudes of the curls within the user input 250 and this is shown in area 256 in FIG. 6 where a stepper motor of a given decurler mechanism 226, 228 is controlled to counteract negative orientation curl (sections of 256 below item 226) and controlled to counteract positive orientation curl (sections of 256 below item 228).

Figure 7:
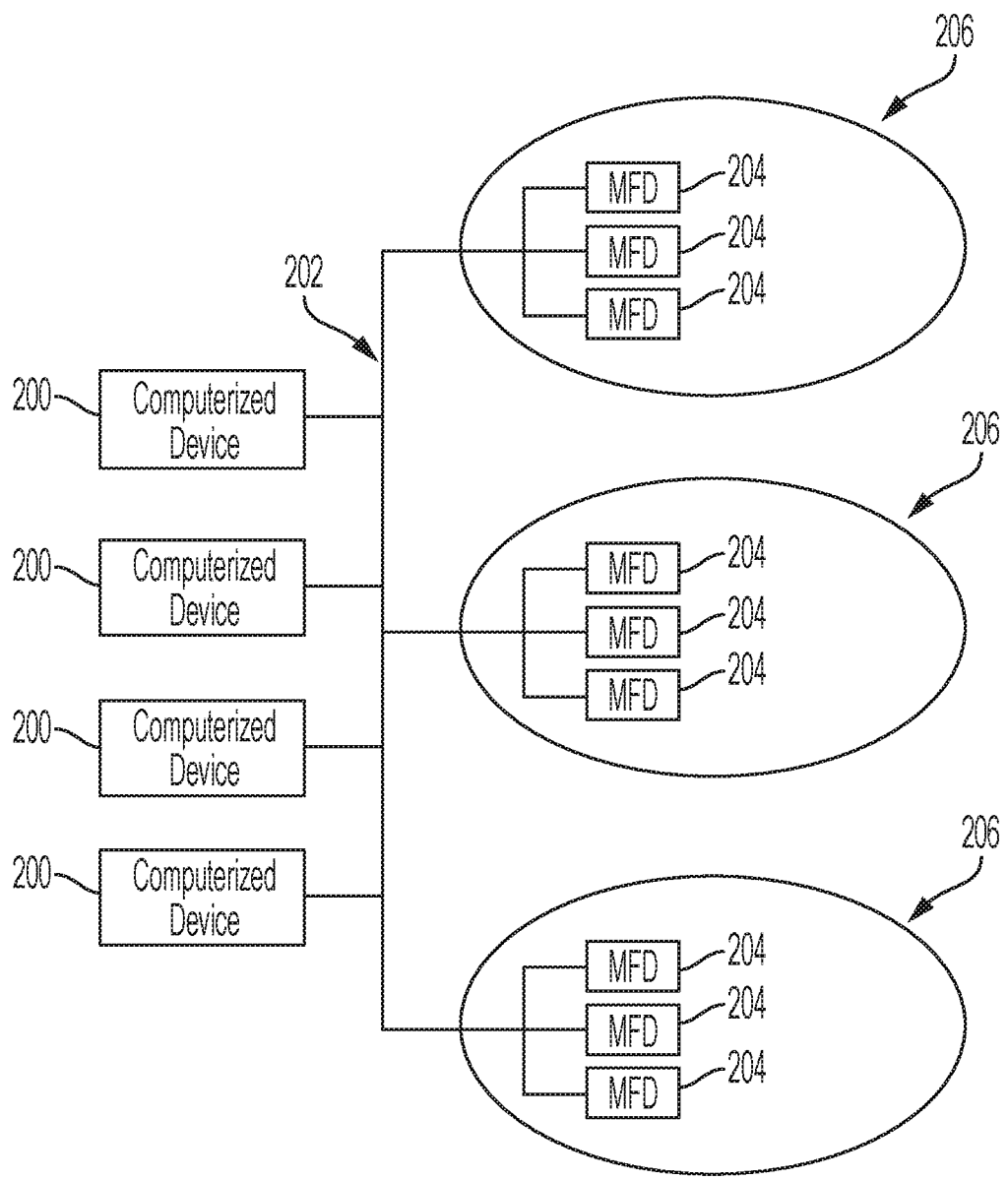
FIG. 7 is a schematic diagram illustrating systems herein.

As shown in FIG. 7, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 8:
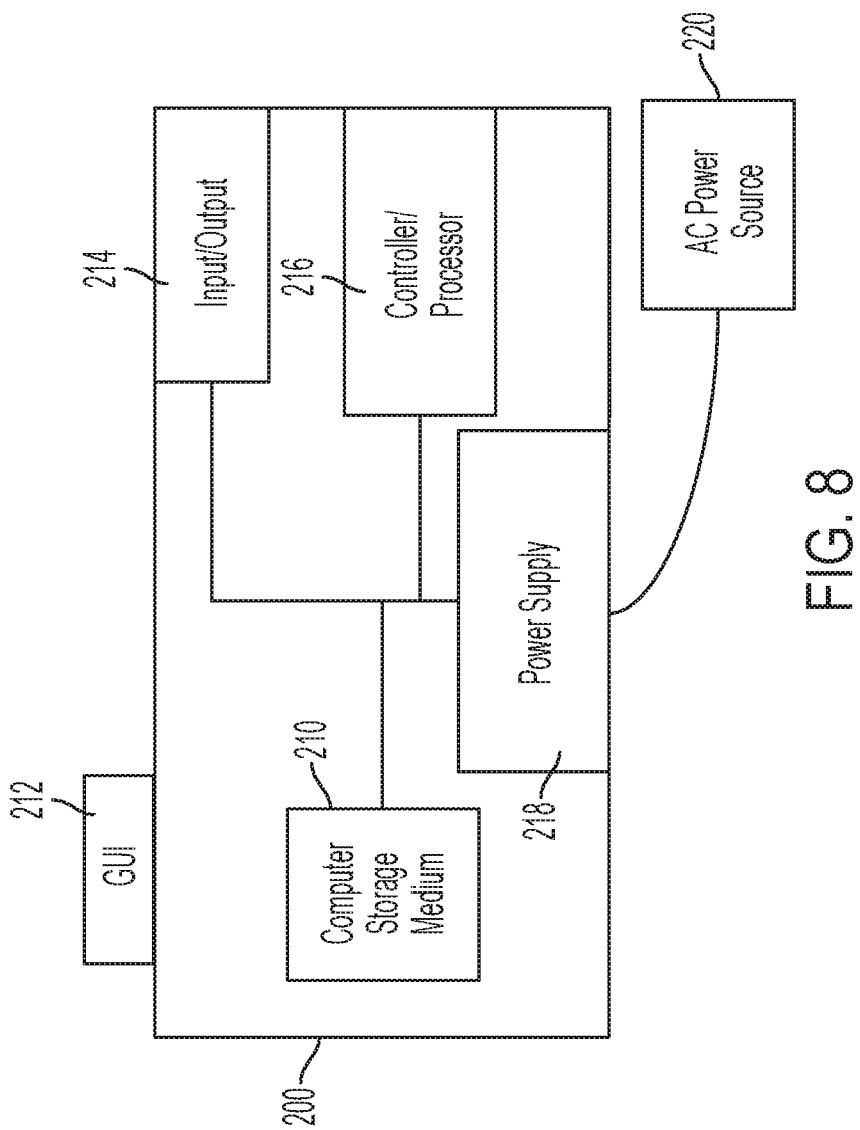
FIGS. 8 and 9 are schematic diagrams illustrating devices herein.

FIG. 8 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 8, a body housing has one or more functional components that operate on power supplied from an alternating current (AC) source 220 by the power supply 218. The power supply 218 can comprise a common power conversion unit, power storage element (e.g., a battery, etc.), etc.

Figure 9:
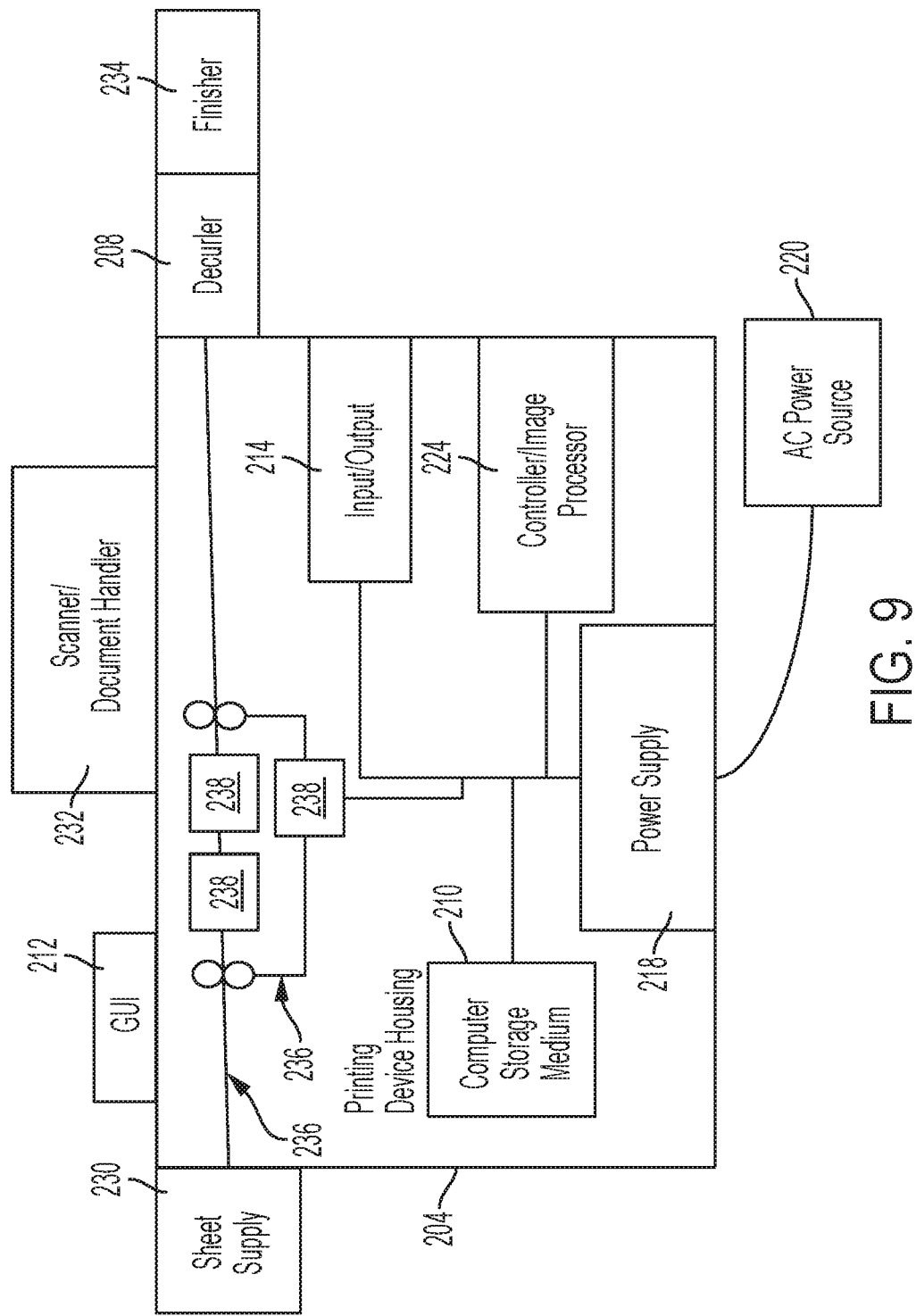

FIG. 9 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 238 operatively connected to a specialized image processor 224 (that is different from a general purpose computer because it is specialized for processing image data), a media path 236 positioned to supply continuous media or sheets of media from a sheet supply 230 to the marking device(s) 238, etc. After receiving various markings from the printing engine(s) 238, the sheets of media can optionally pass to the decurler 208 mentioned above and then on to a finisher/stacker 234 which can stack, fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 238 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A sheet decurler comprising:
   a contact element positioned to receive sheets output from a sheet output device;
   a processor operatively connected to the contact element, wherein the processor is adapted to control the contact element; and
   a user interface operatively connected to the processor, wherein the processor is adapted to control the user interface to display a sheet profile input area adapted to receive user input that corresponds to curl of the sheets output by the sheet output device,
   wherein the processor is adapted to control the contact element to remove the curl of the sheets based on the user input, and
   wherein the contact element is adapted to remove the curl of the sheets by contacting the sheets after the sheets are output from the sheet output device.

2. The sheet decurler in claim 1, wherein the processor is adapted to control the contact element to apply different decurl force to different areas of a sheet of the sheets based on magnitude changes within the user input.

3. The sheet decurler in claim 1, wherein the user input corresponds to curl within a single sheet of the sheets, and wherein the processor is adapted to control the contact element to apply different decurl force to different areas of a sheet of different length segments of each of the sheets based on magnitude changes within the user input.

4. The sheet decurler in claim 1, wherein the sheet profile input area comprises a two-dimensional rectangular area adapted to receive curved line input as the user input.

5. The sheet decurler in claim 4, wherein a length dimension of the two-dimensional rectangular area is adapted to receive a length of a sheet profile from the curved line input, and
   wherein a height dimension of the two-dimensional rectangular area is adapted to receive a height of the sheet profile from the curved line input.

6. The sheet decurler in claim 5, wherein the height dimension of the two-dimensional rectangular area corresponds to a magnitude of different amounts of curl at different locations along the length of the sheet profile, and
   wherein the processor is adapted to control the contact element to apply a relatively higher amount of decurl force to locations along the length of the sheet profile that have a relatively higher magnitude of curl and to apply a relatively lower amount of decurl force to locations along the length of the sheet profile that have a relatively lower magnitude of curl.

7. The sheet decurler in claim 1, wherein the user interface includes a pointer feature, wherein the user input comprises a line input through the pointer feature to the sheet profile input area, and wherein the line has at least one curved portion, and wherein each curve portion of the line represents a magnitude of curl within the sheets.

8. A printing device comprising:
   a printing engine adapted to output sheets;
   a decurler device positioned to receive the sheets output from the printing engine;
   a sheet stacker positioned to receive the sheets from the decurler device;
   a processor operatively connected to the decurler device, wherein the processor is adapted to control the decurler device; and
   a user interface operatively connected to the processor, wherein the processor is adapted to control the user interface to display a sheet profile input area adapted to receive user input that corresponds to curl of the sheets output by the printing engine,
   wherein the processor is adapted to control the decurler device to remove the curl of the sheets based on the user input, and
   wherein the decurler device is adapted to remove the curl of the sheets by contacting the sheets after the sheets are output from the printing engine.

9. The printing device in claim 8, wherein the processor is adapted to control the decurler device to apply different decurl force to different areas of a sheet of the sheets based on magnitude changes within the user input.

10. The printing device in claim 8, wherein the user input corresponds to curl within a single sheet of the sheets, and wherein the processor is adapted to control the decurler device to apply different decurl force to different areas of a sheet of different length segments of each of the sheets based on magnitude changes within the user input.

11. The printing device in claim 8, wherein the sheet profile input area comprises a two-dimensional rectangular area adapted to receive curved line input as the user input.

12. The printing device in claim 11, wherein a length dimension of the two-dimensional rectangular area is adapted to receive a length of a sheet profile from the curved line input, and wherein a height dimension of the two-dimensional rectangular area is adapted to receive a height of the sheet profile from the curved line input.

13. The printing device in claim 12, wherein the height dimension of the two-dimensional rectangular area corresponds to a magnitude of different amounts of curl at different locations along the length of the sheet profile, and wherein the processor is adapted to control the decurler device to apply a relatively higher amount of decurl force to locations along the length of the sheet profile that have a relatively higher magnitude of curl and to apply a relatively lower amount of decurl force to locations along the length of the sheet profile that have a relatively lower magnitude of curl.

14. The printing device in claim 8, wherein the user interface includes a pointer feature, wherein the user input comprises a line input through the pointer feature to the sheet profile input area, and wherein the line has at least one curved portion, and wherein each curve portion of the line represents a magnitude of curl within the sheets.

15. A method comprising:

displaying a sheet profile input area on a user interface, wherein the user interface is in communication with a processor and a decurler device, and wherein the decurler device receives sheets output by a sheet output device;

receiving user input that corresponds to curl of the sheets into the sheet profile input area; and controlling the decurler device to remove the curl of the sheets based on the user input using the processor by causing the decurler device to contact the sheets after the sheets are output from the sheet output device.

16. The method in claim 15, wherein the controlling the decurler device comprises causing the decurler device to apply different decurl force to different areas of a sheet of the sheets based on magnitude changes within the user input.

17. The method in claim 15, wherein the user input corresponds to curl within a single sheet of the sheets, and wherein the controlling the decurler device comprises causing the decurler device to apply different decurl force to different areas of a sheet of different length segments of each of the sheets based on magnitude changes within the user input.

18. The method in claim 15, wherein the sheet profile input area comprises a two-dimensional rectangular area, and wherein the receiving the user input comprises receiving curved line input into the two-dimensional rectangular area as the user input.

19. The method in claim 18, wherein the receiving the user input comprises receiving, into a length dimension of the two-dimensional rectangular area, a length of a sheet profile from the curved line input, and wherein the receiving the user input comprises receiving, into a height dimension of the two-dimensional rectangular area, a height of the sheet profile from the curved line input.

20. The method in claim 19, wherein the height dimension of the two-dimensional rectangular area corresponds to a magnitude of different amounts of curl at different locations along the length of the sheet profile, and wherein the controlling the decurler device comprises causing the decurler device to apply a relatively higher amount of decurl force to locations along the length of the sheet profile that have a relatively higher magnitude of curl and to apply a relatively lower amount of decurl force to locations along the length of the sheet profile that have a relatively lower magnitude of curl.

* * * * *